(12) United States Patent
Chen

(10) Patent No.: US 11,739,820 B2
(45) Date of Patent: Aug. 29, 2023

(54) POWERTRAIN AND ALL-TERRAIN VEHICLE

(71) Applicant: SEGWAY TECHNOLOGY CO., LTD., Changzhou (CN)

(72) Inventor: Shangjian Chen, Changzho (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 9 days.

(21) Appl. No.: 17/534,772

(22) Filed: Nov. 24, 2021

(65) Prior Publication Data

US 2022/0170537 A1 Jun. 2, 2022

(30) Foreign Application Priority Data

| Nov. 27, 2020 | (CN) | 202022809955.5 |
| Nov. 27, 2020 | (CN) | 202022811924.3 |
| Nov. 27, 2020 | (CN) | 202022812078.7 |
| Nov. 27, 2020 | (CN) | 202022812866.6 |
| Nov. 27, 2020 | (CN) | 202022814563.8 |

(51) Int. Cl.
*F16H 37/08* (2006.01)
*B60K 17/06* (2006.01)
*B60K 17/342* (2006.01)

(52) U.S. Cl.
CPC ........... *F16H 37/086* (2013.01); *B60K 17/06* (2013.01); *B60K 17/342* (2013.01); *F16H 2037/0886* (2013.01)

(58) Field of Classification Search
CPC ........... F16H 37/086; F16H 2037/0886; B60K 17/06; B60K 17/342

(Continued)

(56) References Cited

U.S. PATENT DOCUMENTS 4,242,923 A * 1/1981 Nishikawa ........... B60K 17/165
184/6.12
9,242,544 B2 * 1/2016 Kochidomari ....... B60K 7/0007
(Continued)

FOREIGN PATENT DOCUMENTS

| JP | H02120133 A | 5/1990 |
| JP | 2002087083 A | 3/2002 |

OTHER PUBLICATIONS

European Patent Office, Search Report for EP application 21210494.7, dated Mar. 24, 2022.

*Primary Examiner* — Colby M Hansen
(74) *Attorney, Agent, or Firm* — Timothy W. Menasco, Esq.; Harter Secrest & Emery LLP

(57) ABSTRACT

The present disclosure describes a powertrain and an all-terrain vehicle. The powertrain includes an engine, a continuously variable transmission and a transmission. The continuously variable transmission is drivingly coupled to the engine. The transmission includes a casing, a power input shaft, a first power output shaft and a second power output shaft. The power input shaft, the first power output shaft and the second power output shaft are all provided in the casing. The power input shaft is drivingly coupled to the continuously variable transmission, the power input shaft is drivingly coupled to the first power output shaft and the second power output shaft separately in the casing, and an axis of the power input shaft is parallel to an axis of the first power output shaft and perpendicular to an axis of the second power output shaft.

18 Claims, 7 Drawing Sheets

(58) Field of Classification Search
USPC .......................................................... 475/216
See application file for complete search history.

(56) References Cited

U.S. PATENT DOCUMENTS

| | | |
|---|---|---|
| 2011/0039653 A1 | 2/2011 | Hasegawa |
| 2016/0229392 A1* | 8/2016 | Sugitani ................ B60W 10/06 |
| 2019/0145515 A1* | 5/2019 | Aoyama ............ B60K 17/3515 |
| | | 192/3.63 |

* cited by examiner

POWERTRAIN AND ALL-TERRAIN VEHICLE

CROSS-REFERENCE TO RELATED APPLICATION

This application claims priority to and benefits of Chinese Patent Application Serial No. 202022812078.7, filed on Nov. 27, 2020, Chinese Patent Application Serial No. 202022812866.6, filed on Nov. 27, 2020, Chinese Patent Application Serial No. 202022809955.5, filed on Nov. 27, 2020, Chinese Patent Application Serial No. 202022811924.3, filed on Nov. 27, 2020, and Chinese Patent Application Serial No. 202022814563.8, filed on Nov. 27, 2020, the entire content of which are incorporated herein by reference.

FIELD

The present disclosure relates to the field of vehicle technologies, and more particularly, to a powertrain and an all-terrain vehicle.

BACKGROUND

At present, in the all-terrain vehicles available on the markets, an engine and a transmission are integrally formed, and the engine and the transmission share a lubrication system, which speeds up wear of the engine and the transmission. The engine and the transmission arranged in this way not only have poor stability, but are also inconvenient to be mounted and arranged with a propeller shaft of the all-terrain vehicles.

SUMMARY

A powertrain according to embodiments of the present disclosure includes an engine, a continuously variable transmission and a transmission. The continuously variable transmission is drivingly coupled to the engine. The transmission includes a casing, a power input shaft, a first power output shaft and a second power output shaft. The power input shaft, the first power output shaft and the second power output shaft are all provided in the casing. The power input shaft is drivingly coupled to the continuously variable transmission, the power input shaft is drivingly coupled to the first power output shaft and the second power output shaft separately in the casing, and an axis of the power input shaft is parallel to an axis of the first power output shaft and perpendicular to an axis of the second power output shaft.

An all-terrain vehicle according to embodiments of the present disclosure includes two first half shafts; a propeller shaft; and a powertrain. an engine, a continuously variable transmission and a transmission. The continuously variable transmission is drivingly coupled to the engine. The transmission includes a casing, a power input shaft, a first power output shaft and a second power output shaft. The power input shaft, the first power output shaft and the second power output shaft are all provided in the casing. The power input shaft is drivingly coupled to the continuously variable transmission, the power input shaft is drivingly coupled to the first power output shaft and the second power output shaft separately in the casing, and an axis of the power input shaft is parallel to an axis of the first power output shaft and perpendicular to an axis of the second power output shaft. The first power output shaft has a first end coupled to one of the first half shafts and a second end coupled to the other of the first half shafts, the second power output shaft has an end drivingly coupled to the propeller shaft.

BRIEF DESCRIPTION OF THE DRAWINGS

Figure 1:
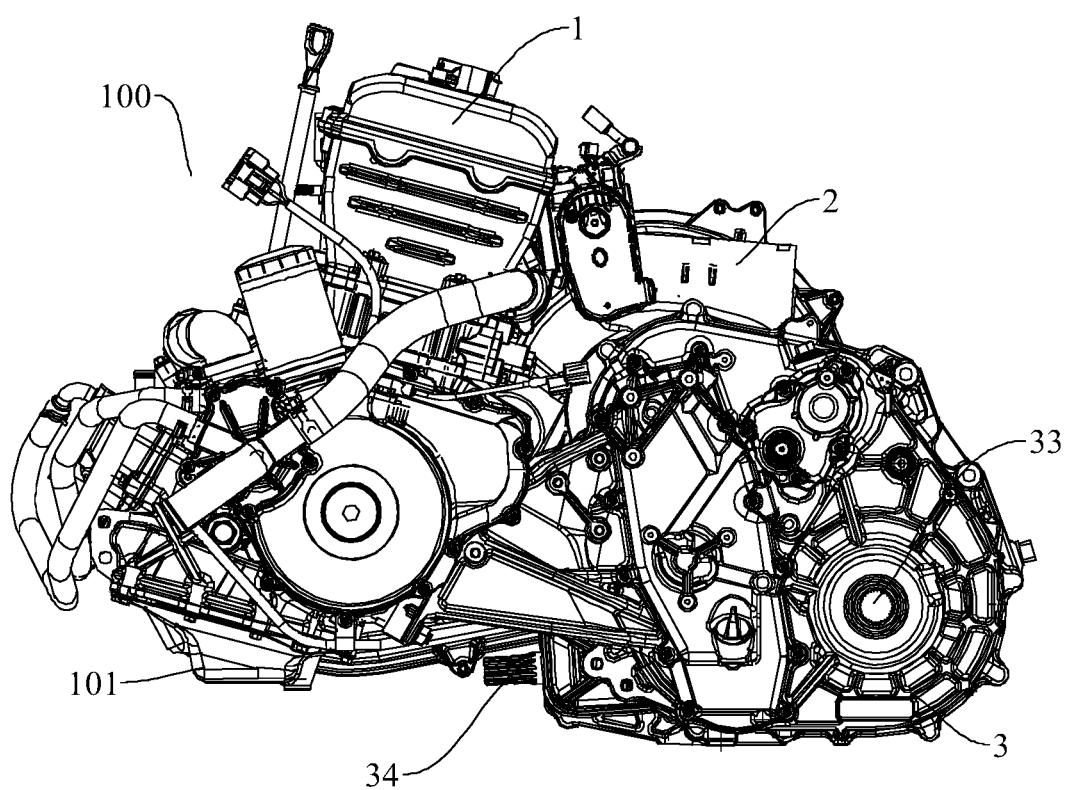
FIG. 1 is a schematic view of a powertrain according to an embodiment of the present disclosure from a first perspective.

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

As illustrated in FIGS. 1 to 9, a powertrain 100 according to embodiments of the present disclosure includes an engine 1, a continuously variable transmission 2 and a transmission 3. The powertrain 100 may be applied to an all-terrain vehicle 1000.

The continuously variable transmission 2 is drivingly coupled to the engine 1.

The transmission 3 includes a casing 31, a power input shaft 32, a first power output shaft 33, and a second power output shaft 34.

The power input shaft 32, the first power output shaft 33 and the second power output shaft 34 are all provided in the casing 31. The power input shaft 32 is drivingly coupled to the continuously variable transmission 2, the power input shaft 32 is drivingly coupled to the first power output shaft 33 and the second power output shaft 34 separately in the casing 31, and an axis of the power input shaft 32 is parallel to an axis of the first power output shaft 33 and is perpendicular to an axis of the second power output shaft 34.

In at least one embodiment, as illustrated in FIGS. 1 to 4, the continuously variable transmission 2 is drivingly coupled to the engine 1, the transmission 3 and the engine 1 may both be located at a left side of the continuously variable transmission 2, and in a front-and-rear direction, the engine 1 may be located at a front side of the transmission 3.

When the powertrain 100 is in normal operation, the engine 1 may transmit power to the continuously variable transmission 2, the continuously variable transmission 2 processes the power and then transmits it to the power input shaft 32 drivingly coupled to the continuously variable transmission 2. Thus the continuously variable transmission 2 may transmit the power to the transmission 3, to make the powertrain 100 achieve an effect of variable speed.

Thus, the powertrain 100 can ensure mutual independence of individual parts, and avoid mutual influence of individual parts in the powertrain 100 to promote structural stability of individual parts in the powertrain 100; furthermore, power transmission of the powertrain 100 can be smooth, to promote reliability of the powertrain 100.

In addition, with reference to FIGS. 3, 6, 7 and 5, the casing 31 internally defines a relatively sealed space, the power input shaft 32, the first power output shaft 33 and the second power output shaft 34 are all provided in internal space of the casing 31, and the casing 31 may be made of relatively sturdy material. In this way, not only can foreign matter be prevented from entering the casing 31, which damages internal components of the casing 31, but the relatively hard casing 31 can prevent an external force from damaging internal components of the casing 31 when the external force strikes the transmission 3, to promote structural reliability of the transmission 3.

Further, the power input shaft 32 is drivingly coupled to the first power output shaft 33 and the second power output shaft 34 separately. In at least one embodiment, after the continuously variable transmission 2 transmits power to the power input shaft 32, the power input shaft 32 transmits the power to the first power output shaft 33 and the second power output shaft 34 respectively, and the first power output shaft 33 and the second power output shaft 34 may transmit power to different wheels respectively. This not only makes structure of the transmission 3 compact, but also promotes performance of the vehicle. For example, the first power output shaft 33 may transmit power directly to wheels located at a rear side, and the second power output shaft 34 may transmit power directly to wheels located at a front side, to realize four-wheel drive of the vehicle.

Figure 8:
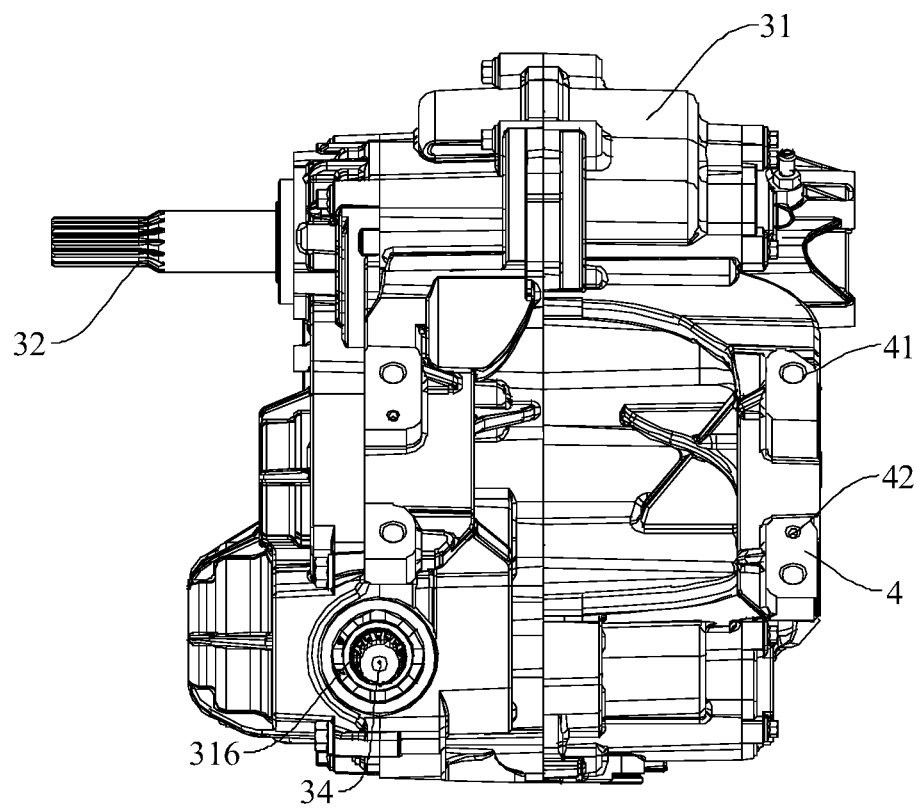
FIG. 8 is a third plan view of a transmission according to an embodiment of the present disclosure.
Figure 9:
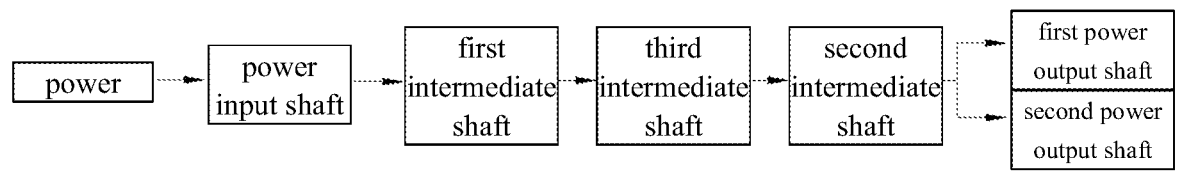
FIG. 9 is a flow chart of power transmission of a powertrain according to an embodiment of the present disclosure.
Figure 10:
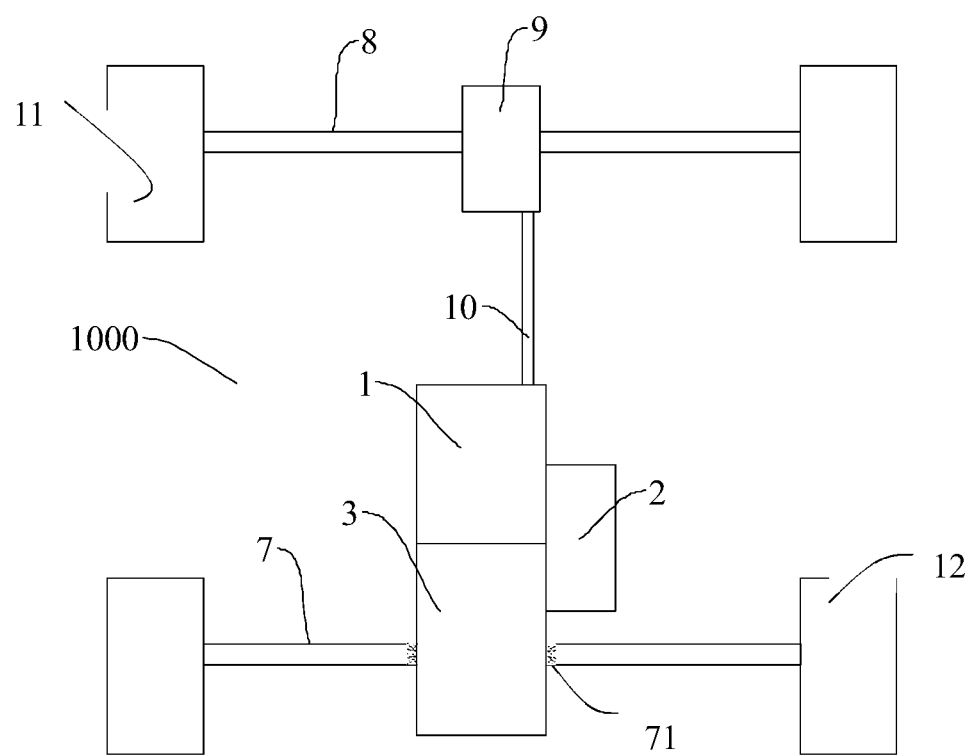
FIG. 10 is a schematic view of an all-terrain vehicle according to an embodiment of the present disclosure.

With reference to FIGS. 1 and 8, an output end of the second power output shaft 34 protrudes towards the engine 1, and in an axial direction of the power input shaft 32, the second power output shaft 34 is located at a side of the casing 31 closes to the continuously variable transmission 2 than a side of the casing 31 away from the continuously variable transmission 2. In at least one embodiment, the output end of the second power output shaft 34 is arranged to protrude towards the engine 1, available space in the powertrain 100 can be fully utilized, to promote space utilization of the powertrain 100, and the structure of the powertrain 100 can be more compact, to reduce occupancy space of the powertrain 100. Furthermore, the second power output shaft 34 is arranged at a side of the casing 31 close to the continuously variable transmission 2, and this can facilitates mounting and arrangement of the propeller shaft 10 drivingly coupled to the second power output shaft 34, to make structural layout of the powertrain 100 more reasonable and further promote structural reliability of the powertrain 100.

Thus, by drivingly coupling the power input shaft 32 to the continuously variable transmission 2 and arranging the second power output shaft 34 at a side of the casing 31 close to the continuously variable transmission 2, mounting and arrangement of the propeller shaft 10 drivingly coupled to the second power output shaft 34 can be facilitated, and the overall layout of the powertrain 100 can be reasonable, to make overall stability of the powertrain 100 better and optimize the structural design of the powertrain 100.

Figure 3:
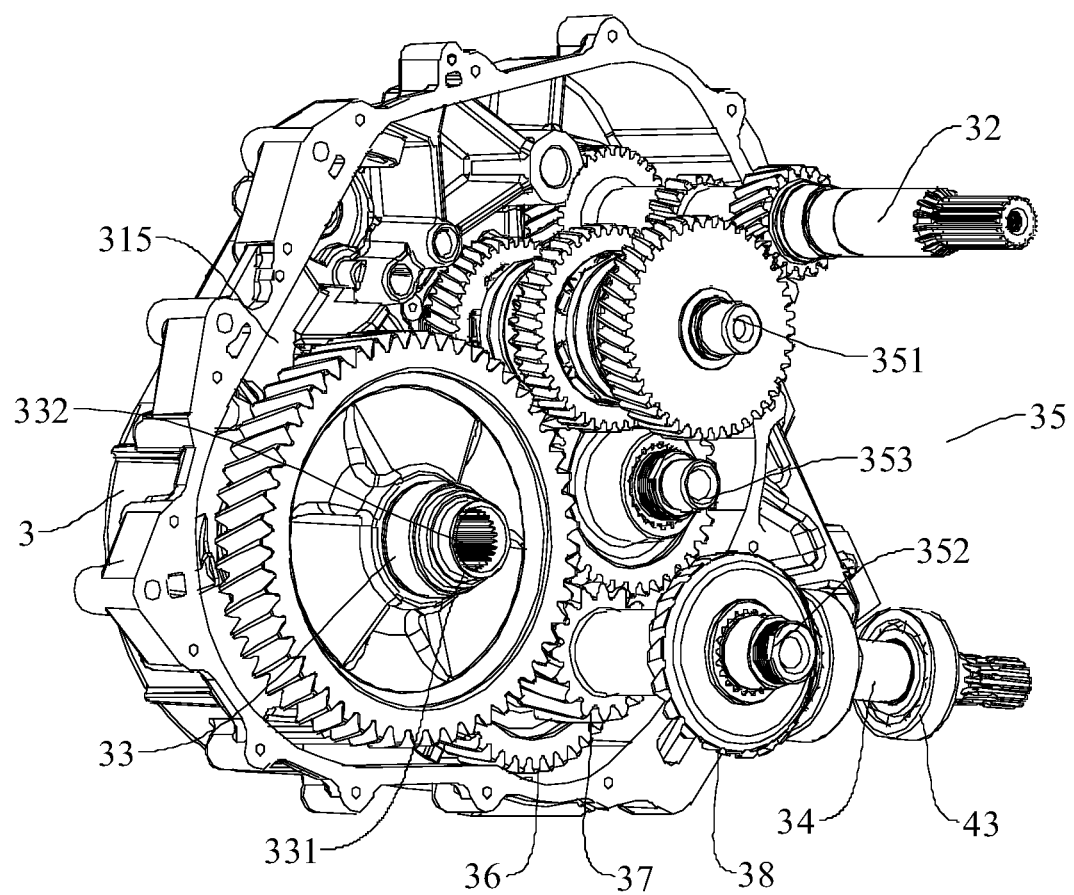
FIG. 3 is a schematic view of a transmission in a powertrain according to an embodiment of the present disclosure, with a second sub-casing and a fourth sub-casing removed.
Figure 6:
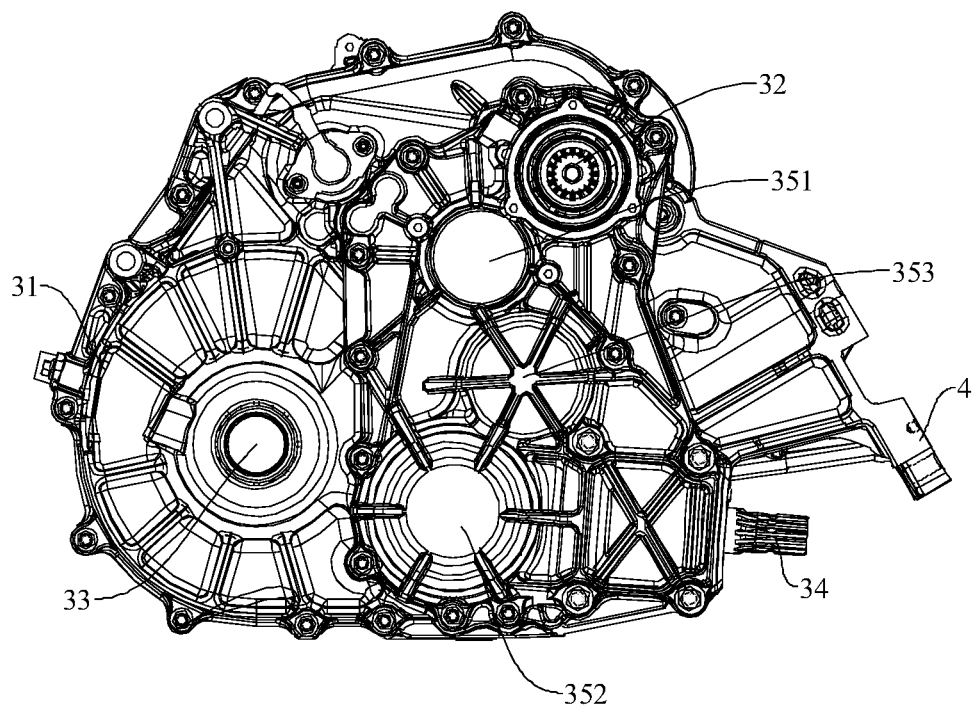
FIG. 6 is a first plan view of a transmission according to an embodiment of the present disclosure.

With reference to FIGS. 3 and 6, the axis of the power input shaft 32 is parallel to the axis of the first power output shaft 33, and the axis of the power input shaft 32 is perpendicular to the axis of the second power output shaft 34, and this can make structural arrangement of the power input shaft 32, the first power output shaft 33 and the second power output shaft 34 reasonable, and the internal structure of the transmission 3 more compact. In addition, the second power output shaft 34 may fully utilize space in the transmission 3 in a direction perpendicular to the axis of the power input shaft 32, and this not only promotes space utilization, but also realizes power transmission to the propeller shaft 10 located at the front side by changing an output direction, to simplify power transmission path of the powertrain 100 and make power transmission more reliable.

Thus, by arranging the axis of the power input shaft 32 to be parallel to the axis of the first power output shaft 33 and arranging the axis of the power input shaft 32 to be perpendicular to the axis of the second power output shaft 34, the internal structure of the casing 31 can be compact, and driving-coupling between the second power output shaft 34 and the corresponding propeller shaft 10 can be facilitated by changing the output direction of the second power output shaft 34.

In some embodiments, a plane perpendicular to an axis direction of the power input shaft 32 is taken as a reference plane, and a projection of the continuously variable transmission 2 on the reference plane and a projection of the second power output shaft 34 on the reference plane at least partially overlap.

In at least one embodiment, as illustrated in FIG. 1, in the case where arrangement of the continuously variable transmission 2 does not affect normal arrangement and operation of the second power output shaft 34, this arrangement makes the structure of the powertrain 100 more compact, and structural arrangement of the powertrain 100 more reasonable, to promote power transmission efficiency of the powertrain 100 and reduce volume of the powertrain 100.

In some embodiments, when the powertrain 100 is mounted on a vehicle, a gap exists between a projection of the continuously variable transmission 2 on a horizontal plane and a projection of the second power output shaft 34 on the horizontal plane.

In at least one embodiment, the continuously variable transmission 2 and the second power output shaft 34 may be spaced apart in a coupling direction of the transmission 3 and the continuously variable transmission 2. This arrangement can make the continuously variable transmission 2 and the second power output shaft 34 independent of each other. The continuously variable transmission 2 will not affect arrangement and normal operation of the second power output shaft 34, and when the second power output shaft 34 is drivingly coupled to the propeller shaft 10 coupled to the second power output shaft 34, the continuously variable transmission 2 will not hinder driving-coupling of the propeller shaft 10 and the second power output shaft 34. This not only makes the arrangement of the powertrain 100 more reasonable, but also ensures structural reliability of the powertrain 100.

In some embodiments, the casing 31 internally defines a first cavity 315 and a second cavity 316 in communication with each other. The power input shaft 32 and the first power output shaft 33 are provided in the first cavity 315, the second power output shaft 34 is provided in the second cavity 316, and an end of the second cavity 316 towards the engine 1 is configured as an opening from which the second power output shaft 34 protrudes.

In at least one embodiment, as illustrated in FIGS. 1, 3 and 6, the first sub-casing 311 is arranged opposite the second sub-casing 312 to define a relatively sealed first cavity 315. Oppositely arranged first sub-casing 311 and second sub-casing 312 can ensure leakproofness and reliability of the first cavity 315, and can promote strength of the casing 31; the third sub-casing 313 arranged at a side of the first sub-casing 311 away from the second sub-casing 312 can further promote structural strength of the casing 31. The power input shaft 32 and the first power output shaft 33 are provided in the first cavity 315. The first cavity 315 can provide sufficient space for mounting and arrangement of the power input shaft 32 and the first power output shaft 33, and the first cavity 315 can protect the power input shaft 32 and the first power output shaft 33 from foreign matter damage. The second cavity 316 can protect the second power output shaft 34 from damage, and the first cavity 315 and the second cavity 316 can also ensure stability of normal transmission of the power input shaft 32, the first power output shaft 33 and the second power output shaft 34 and avoid mutual interference, to further promote structural stability of the powertrain 100.

In at least one embodiment, as illustrated in FIGS. 3 and 6, the second power output shaft 34 protrudes from the opening, thus mounting and arrangement of the propeller shaft 10 drivingly coupled to the second power output shaft 34 can be facilitated. In addition, in the axial direction of the power input shaft 32, the second power output shaft 34 is located at a side of the casing 31 close to the continuously variable transmission 2, to ensure mutual fitting of the second power output shaft 34 and the power input shaft 32 and ensure normal power output. This can make overall layout of the powertrain 100 more reasonable, and ensure stability and reliability of the powertrain 100.

In some embodiments, the axis of the first power output shaft 33 is higher than the axis of the second power output shaft 34.

In at least one embodiment, as illustrated in FIGS. 3 and 6, the second power output shaft 34 needs to protrude through avoidance space 102 of a bottom of an oil sump 101 of the engine 1, and hence the axis of the second power output shaft 34 is provided at a lower position in the transmission 3. Since both the first power output shaft 33 and the second power output shaft 34 are drivingly coupled to the power input shaft 32, and in order to make structural arrangement of the transmission 3 compact and reduce volume of the transmission 3, the axis of the first power output shaft 33 needs to design to be higher than the axis of the second power output shaft 34, and the axis of the first power output shaft 33 and the axis of the second power output shaft 34 are not in a straight line. This can, under the premise of ensuring normal operation of the transmission 3, make internal structure of the transmission 3 more compact, to make overall layout of internal structure of the transmission 3 more reasonable.

In some embodiments, the axis of the first power output shaft 33 is at an angle to the axis of the second power output shaft 34.

In at least one embodiment, as illustrated in FIG. 3, that is to say, the first power output shaft 33 and the second power output shaft 34 have different power output directions. This can facilitate arrangement of the first power output shaft 33 and the second power output shaft 34 while meeting requirements of power output coupling of the transmission 3 with the outside, to make power output coupling of the transmission 3 with the outside selectable, achieving the effect of variable speed. This type of transmission 3 may be applied to a four-wheel drive vehicle.

In some embodiments, the transmission 3 further includes a plurality of intermediate shafts 35 drivingly coupled sequentially, the plurality of intermediate shafts 35 are provided in the casing 31 and include a first intermediate shaft 351 drivingly coupled to the power input shaft 32 and a second intermediate shaft 352 drivingly coupled to both of the first power output shaft 33 and the second power output shaft 34, and an axis of the second intermediate shaft 352 is lower than the axis of the first power output shaft 33.

In at least one embodiment, as illustrated in FIGS. 3 and 6, the first intermediate shaft 351, the second intermediate shaft 352 and the third intermediate shaft 353 are provided in the transmission 3, the power input shaft 32 may transmit power to the first intermediate shaft 351, the first intermediate shaft 351 transmits power to the second intermediate shaft 352, and the second intermediate shaft 352 transmits power to the first power output shaft 33 and the second power output shaft 34, to render the transmission 3 to achieve the effect of variable speed. The axis of the second intermediate shaft 352 is lower than the axis of the first power output shaft 33, and this can make structural arrangement of the first intermediate shaft 351 and the second intermediate shaft 352 more reasonable, and facilitate power output from the second intermediate shaft 352 to the first power output shaft 33 and the second power output shaft 34, making internal structure of the transmission 3 more compact and further reducing volume of the transmission 3.

In some embodiments, the axis of the second intermediate shaft 352 is parallel to the axis of the first power output shaft 33 and perpendicular to the axis of the second power output shaft 34.

As illustrated in FIG. 3, the axis of the second intermediate shaft 352 is parallel to the axis of the first power output shaft 33, and the second intermediate shaft 352 can transmit power in parallel with the first power output shaft 33 to output the power. The axis of the second intermediate shaft 352 is perpendicular to the axis of the second power output shaft 34, and the second intermediate shaft 352 can transmit power vertically with the second power output shaft 34 to output the power. This can facilitate arrangement of the second intermediate shaft 352, the first power output shaft 33 and the second power output shaft 34 in the transmission, to make the transmission more compact, and make the power output coupling of the transmission with the outside selectable, achieving the effect of variable speed.

An axis direction of the first power output shaft 33 may be the same as a lateral direction of the vehicle (i.e., a left-and-right direction), and an axis direction of the second power output shaft 34 may be the same as a longitudinal direction of the vehicle (i.e., a front-and-rear direction). Thus, the first power output shaft 33 can transmit power to a corresponding group of half shafts directly, and the second power output shaft 34 can transmit power to another corresponding group of half shafts through a corresponding propeller shaft 10 and final drive 9.

In some embodiments, the second intermediate shaft 352 and the first power output shaft 33 are provided with a spur gear set or helical gear set therebetween, and the second intermediate shaft 352 and the second power output shaft 34 are provided with a bevel gear set therebetween.

In at least one embodiment, as illustrated in FIG. 3, the spur gear set or the helical gear set are provided between the second intermediate shaft 352 and the first power output shaft 33, to meet the requirements of parallel power transmission between the second intermediate shaft 352 and the first power output shaft 33; and the bevel gear set is provided between the second intermediate shaft 352 and the second power output shaft 34, to meet the requirements of vertical power transmission between the second intermediate shaft 352 and the second power output shaft 34, realizing different power output directions. The second intermediate shaft 352 arranged in this way can transmit power to two power output shafts at the same time.

In at least one embodiment, as illustrated in FIG. 3, the second intermediate shaft 352 is provided with a first gear 36, a second gear 37 and a third gear 38. The first gear 36 is drivingly fitted with the first intermediate shaft 351, the second gear 37 is drivingly fitted with the first power output shaft 33, and the third gear 38 is drivingly fitted with the second power output shaft 34. The first gear 36, the second gear 37 and the third gear 38 are arranged sequentially in the axial direction, the first gear 36 and the second gear 37 are both provided between the first sub-casing 311 and the second sub-casing 312, and the third gear 38 is provided between the second sub-casing 312 and the fourth sub-casing 314.

The first gear 36 and a gear of the third intermediate shaft 353 are in meshing transmission, the first intermediate shaft 351 can transmit power to the first gear 36 and rotate the second intermediate shaft 352, the rotation of the second intermediate shaft 352 will drive rotation of the second gear 37 and the third gear 38, and the second gear 37 and the third gear 38 will respectively drive the gear of first power output shaft 33 and the gear of the second power output shaft 34 to rotate, to realize power transmission in the transmission. The three gears arranged in this way have reasonable position arrangement, and can make transmission stable and reliable.

The first sub-casing 311 and the second sub-casing 312 can protect the first gear 36 and the second gear 37 from foreign matter damage, and the second sub-casing 312 and the fourth sub-casing 314 can protect the third gear 38 from foreign matter damage, to promote structural reliability of the second intermediate shaft 352. In addition, this arrangement can also isolate the first gear 36, the second gear 37 and the third gear 38, and this can ensure that the first gear 36, the second gear 37 and the third gear 38 will not interfere with one another during normal rotation, and that mounting and arrangement of transmission structure of the first gear 36, the second gear 37 and the third gear 38 will not affect one another, to further promote structural reliability of the transmission.

In some embodiments, axes of the plurality of intermediate shafts 35 are arranged in parallel with the axis of the power input shaft 32.

In at least one embodiment, as illustrated in FIG. 3, the axes of the plurality of intermediate shafts 35 and the axis of the power input shaft 32 are arranged in parallel, thus parallel power transmission is formed between the plurality of intermediate shafts 35 and the power input shaft 32, and arrangement of the plurality of intermediate shafts 35 and the power input shaft 32 in the transmission can be more convenient, to reduce volume of the transmission as much as possible.

In some embodiments, the first power output shaft 33 is located obliquely above the second intermediate shaft 352.

In at least one embodiment, as illustrated in FIG. 3, the first power output shaft 33 is provided obliquely above the second intermediate shaft 352, thus power input coupling with the outside can be facilitated, occupancy space of the first power output shaft 33 can be reduced as much as possible, and position arrangement of the second intermediate shaft 352 is more reasonable, realizing power transmission.

In some embodiments, the plurality of intermediate shafts 35 also include a third intermediate shaft 353. The third intermediate shaft 353 is drivingly coupled to the first intermediate shaft 351 and the second intermediate shaft 352 separately. The power input shaft 32 is located obliquely above the first intermediate shaft 351, the first intermediate shaft 351 is located obliquely above the third intermediate shaft 353, and the third intermediate shaft 353 is located obliquely above the second intermediate shaft 352.

In at least one embodiment, as illustrated in FIGS. 3 and 6, the third intermediate shaft 353 may also be provided between the first intermediate shaft 351 and the second intermediate shaft 352. The first intermediate shaft 351 may transmit power to the third intermediate shaft 353, and the third intermediate shaft 353 transmits power to the second intermediate shaft 352. The plurality of intermediate shafts 35 rotate sequentially to avoid unstable power transmission due to sharp power rising or dropping, and this can promote stability and reliability of power transmission of the intermediate shafts 35. In addition, by arranging the plurality of intermediate shafts 35 reasonably, the plurality of intermediate shafts 35 can accommodate different internal structural arrangements of different transmissions 3, thus applicability of the intermediate shafts 35 can be promoted, the insides of different transmissions 3 can also be relatively compact, and the structural reliability of the transmission 3 can further promoted.

Since various shafts in the transmission are provided with round gears, the power input shaft 32, the first intermediate shaft 351, the second intermediate shaft 352 and the third intermediate shaft 353 arranged in this way can ensure that under the premise of normal transmission of the power input shaft 32, the first intermediate shaft 351, the second intermediate shaft 352 and the third intermediate shaft 353, the internal structure of the transmission can be more compact, the volume of the transmission can be further reduced, and occupancy space of the transmission can be further reduced.

The power input shaft 32 and the first intermediate shaft 351 are in reduction transmission, the first intermediate shaft 351 and the third intermediate shaft 353 are in reduction transmission, the third intermediate shaft 353 and the second intermediate shaft 352 are in reduction transmission, the second intermediate shaft 352 and the first power output shaft 33 are in reduction transmission, and the second intermediate shaft 352 and second power output shaft 34 are in reduction transmission. Thus, power undergoes multi-stage reduction transmission, and stability of the power output of the engine 1 of the all-terrain vehicle 1000 can be ensured.

In some embodiments, a plane where an axis of the first intermediate shaft 351 and the axis of the second intermediate shaft 352 lie is a first plane, the power input shaft 32 and the third intermediate shaft 353 are located at a same side of the first plane, and the power input shaft 32 and the first power output shaft 33 are located at two sides of the first plane, respectively.

Figure 7:
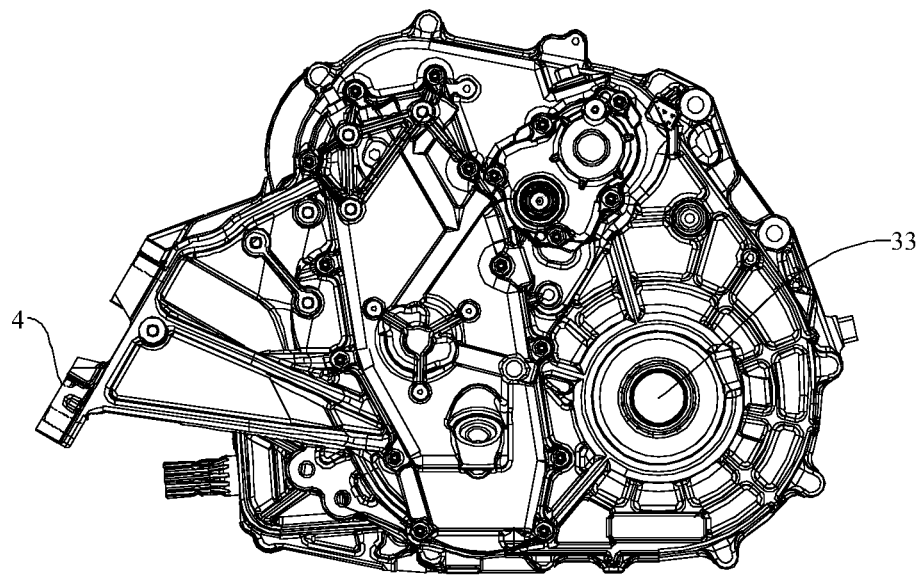
FIG. 7 is a second plan view of a transmission according to an embodiment of the present disclosure.

In at least one embodiment, as illustrated in FIGS. 3 and 7, the power input shaft 32 is located obliquely above the first intermediate shaft 351, the first intermediate shaft 351 is located obliquely above the third intermediate shaft 353, and the third intermediate shaft 353 is located obliquely above the second intermediate shaft 352. Hence, the power input shaft 32 and the third intermediate shaft 353 are located at the same side (i.e., a front side) of the first plane determined by the axis of the first intermediate shaft 351 and the axis of the second intermediate shaft 352, this makes internal space of transmission in an up-and-down direction occupied by the power input shaft 32, the first intermediate shaft 351, the second intermediate shaft 352 and the third intermediate shaft 353 minimum, and also ensures that internal space of the transmission in the left-and-right direction occupied by the power input shaft 32, the first intermediate shaft 351, the second intermediate shaft 352 and the third intermediate shaft 353 is minimum, to make internal structure of the transmission more compact and further reduce volume of the transmission.

The power input shaft 32 and the first power output shaft 33 are located at two sides of the first plane formed by the axis of the first intermediate shaft 351 and the axis of the second intermediate shaft 352, respectively. Thus, the power input shaft 32 and the first power output shaft 33 can fully utilize space of the transmission in the up-and-down direction and in the front-and-rear direction, and under the premise of ensuring normal transmission of the transmission, various shafts of the transmission can be reasonable, and space utilization of the transmission can be promoted, to make internal structure of the transmission more compact and further reduce volume of the transmission.

In some embodiments, the axis of the first power output shaft 33, the axis of the second intermediate shaft 352 and the axis of the second power output shaft 34 are in a non-coplanar relationship.

In at least one embodiment, as illustrated in FIGS. 3 and 7, the axis of the power input shaft 32 is perpendicular to the axis of the second power output shaft 34, and the axis of the first power output shaft 33, the axis of the second intermediate shaft 352 and the axis of the power input shaft 32 are all arranged in parallel. Hence, the axis of the first power output shaft 33, the axis of the second intermediate shaft 352 and the axis of the second power output shaft 34 are not in a plane. Thus, the second power output shaft 34 can fully utilize space in the transmission in a direction perpendicular to the axis of the power input shaft 32, and the internal structure of the transmission can be more compact, the volume of the transmission can be further reduced, and forward driving-coupling of the second power output shaft 34 to the corresponding propeller shaft 10 can be convenient.

In some embodiments, a plane where the axis of the second intermediate shaft 352 and the axis of the second power output shaft 34 lie is a second plane, and the power input shaft 32 and the first power output shaft 33 are located at a same side of the second plane.

In at least one embodiment, as illustrated in FIGS. 3 and 7, the power input shaft 32 and the first power output shaft 33 are located at an upper side of the second plane. The power input shaft 32 and the first power output shaft 33 are provided at the upper side of the second plane where the axis of the second intermediate shaft 352 and the axis of the second power output shaft 34 lie, the power input shaft 32 and the first power output shaft 33 can be distributed reasonably, and internal space of the transmission can be fully utilized, to make the structure of the transmission more compact, and further reduce the volume of the transmission.

In some embodiments, the casing 31 includes: a first sub-casing 311, a second sub-casing 312, and a third sub-casing 313. The first sub-casing 311 is arranged opposite the second sub-casing 312, the first sub-casing 311 defines a first shaft hole 3111, the third sub-casing 313 is detachably coupled to a side of the first sub-casing 311 away from the second sub-casing 312 and covers the first shaft hole 3111. The intermediate shaft 35 is provided on the first sub-casing 311 and the second sub-casing 312 and has an end protruding from first shaft hole 3111 towards the third sub-casing 313, an end of the intermediate shaft 35 is provided with a fastener 354, and the fastener 354 is located between the first sub-casing 311 and the third sub-casing 313.

Figure 5:
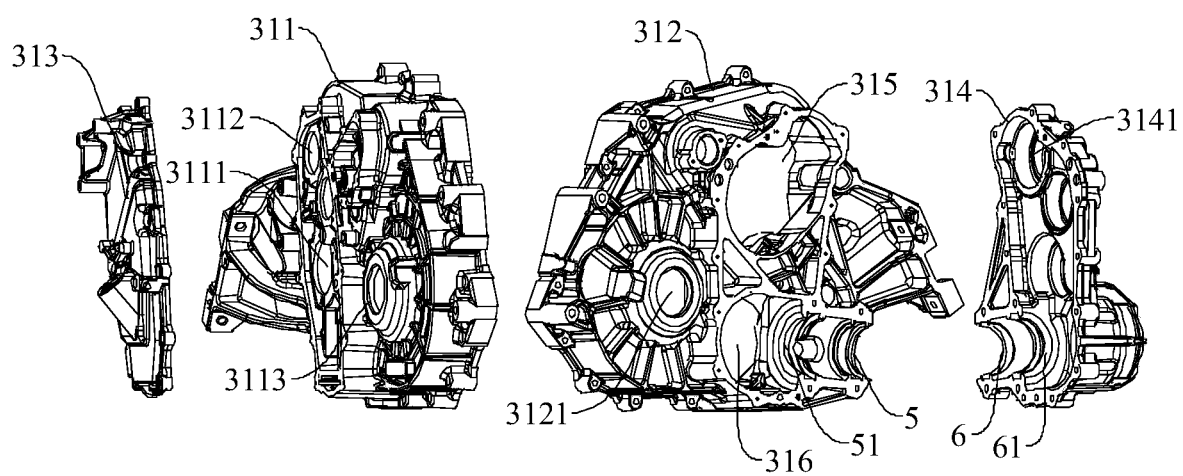
FIG. 5 is an exploded view of a casing of a transmission in a powertrain according to an embodiment of the present disclosure.

In at least one embodiment, as illustrated in FIG. 5, the first sub-casing 311 and the second sub-casing 312 are arranged oppositely and may fitted with each other to define a mounting space for mounting and arrangement of corresponding components, to ensure structural stability and reliability of the corresponding components.

Further, the first sub-casing 311 defines the first shaft hole 3111, and the third sub-casing 313 provided at the side of the first sub-casing 311 away from the second sub-casing 312 can cover the first shaft hole 3111. The third sub-casing 313 arranged in this way can seal the side of the first sub-casing 311 away from the second sub-casing 312, the structure protruded from the first shaft hole 3111 can be protected from damage, and structural reliability of the transmission 3 can be promoted.

In addition, as illustrated in FIG. 5, the third sub-casing 313 is detachably coupled to the side of the first sub-casing 311 away from the second sub-casing 312, structural strength of the casing 31 of the transmission 3 can be further promoted, overall leakproofness of the casing 31 can be further promoted, structural reliability of the transmission 3 can be further promoted, and service life of the transmission 3 may be prolonged. In addition, this arrangement can also make the third sub-casing 313 easy to mount or detach, to facilitate maintenance or replacement of corresponding internal components of the transmission 3 by a user.

Figure 4:
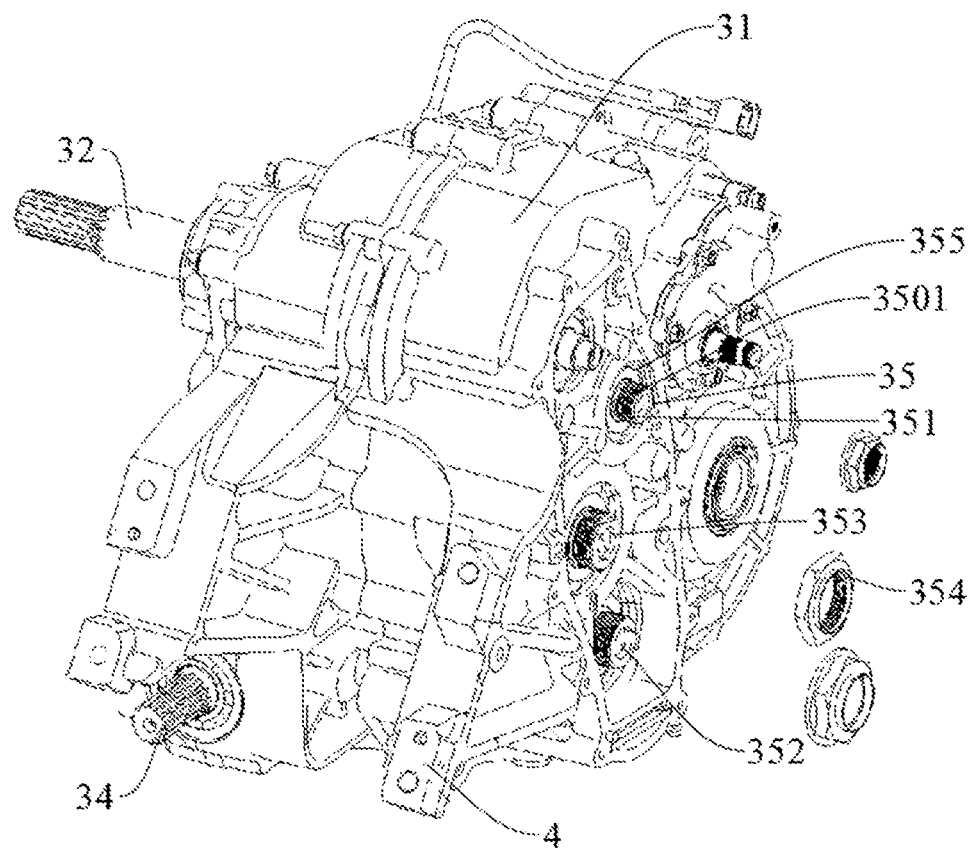
FIG. 4 is a schematic view of a transmission in a powertrain according to an embodiment of the present disclosure from another perspective.

As illustrated in FIG. 4, the intermediate shaft 35 is provided on the first sub-casing 311 and the second sub-casing 312, and an end of the intermediate shaft 35 protrudes from the first shaft hole 3111 towards the third sub-casing 313, and in order to realize axial limit of the intermediate shaft 35, the end of the intermediate shaft 35 protruded from the first shaft hole 3111 towards the third sub-casing 313 is provided with the fastener 354, that is, the fastener 354 is located between the first sub-casing 311 and the third sub-casing 313. In at least one embodiment, the intermediate shaft 35 is provided on the first sub-casing 311 and the second sub-casing 312, and the intermediate shaft 35 is rotatable in the mounting space defined by the first sub-casing 311 and the second sub-casing 312, to realize power transmission. An end of the intermediate shaft 35 protrudes from the first shaft hole 3111 towards the third sub-casing 313, the fastener 354 is provided on the end of the intermediate shaft 35 protruded from the first shaft hole 3111, and the fastener 354 is fixedly coupled to the intermediate shaft 35. Thus, the fastener 354 can fix the intermediate shaft 35 axially, and avoid abnormal noise or failure of the transmission 3 due to axial displacement during rotation of the intermediate shaft 35, to further promote structural reliability of the transmission 3.

In the process of production and assembly of the transmission 3, the fastener 354 may be fastened on an end of the intermediate shaft 35, and then the third sub-casing 313 is mounted, to reduce mounting difficulty of the fastener 354, and also reduce assembly difficulty of the transmission 3.

Thus, four sub-casings are fitted with one another to form the casing 31 of the transmission 3, the structure of the casing 31 can be more stable and firm, and the fastener 354 can be conveniently fastened on the end of the intermediate shaft 35, to prevent the position of the intermediate shaft 35 from shifting and promote reliability of the intermediate shaft 35.

Further, as illustrated in FIG. 5, the casing 31 also includes a fourth sub-casing 314. The fourth sub-casing 314 is provided at a side of the second sub-casing 312 away from the first sub-casing 311, and defines a second cavity 316 together with the second sub-casing 312, and the second sub-casing 312 and the fourth sub-casing 314 are fixedly coupled to the continuously variable transmission 2. In at least one embodiment, the fourth sub-casing 314 is provided at the side of the second sub-casing 312 away from the first sub-casing 311, and the fourth sub-casing 314 and the second sub-casing 312 may be fitted with each other, to define relatively sealed second cavity 316. The second power output shaft 34 is provided in the second cavity 316, and the second cavity 316 can protect the second power output shaft 34, to promote structural reliability of the second power output shaft 34. Furthermore, the second sub-casing 312 and the fourth sub-casing 314 may be fixedly coupled to the continuously variable transmission 2, and this not only ensures stability and firmness of fixed coupling of the continuously variable transmission 2 and the transmission 3, but also makes structural arrangement of the powertrain 100 more compact, to make overall layout of the powertrain 100 more reasonable and optimize structural design of the powertrain 100.

In some embodiments, the first shaft hole 3111 is internally provided with a first bearing 355, and an end of the intermediate shaft 35 passes through the first bearing 355 and protrudes towards the third sub-casing 313. The end of the intermediate shaft 35 protruded from the first shaft hole 3111 towards the third sub-casing 313 is provided with a threaded portion 3501. The threaded portion 3501 is an external thread, and the fastener 354 is a nut; or the threaded portion 3501 is an internal thread, and the fastener 354 is a bolt.

In at least one embodiment, as illustrated in FIG. 4, the first bearing 355 is provided in the first shaft hole 3111, an end of the intermediate shaft 35 passes through the first bearing 355 and protrudes towards the third sub-casing 313, and a rolling member is provided between the first bearing 355 and the intermediate shaft 35. Thus, the first bearing 355 can have a support effect on the intermediate shaft 35, to reduce friction coefficient of the intermediate shaft 35 during rotation. This arrangement can promote rotation efficiency of the intermediate shaft 35, reduce power loss due to frictional force during rotation of the intermediate shaft 35, reduce structural wear of the intermediate shaft 35 and the first sub-casing 311, and prolong service life of the intermediate shaft 35. In addition, the first bearing 355 can also ensure rotary accuracy of the intermediate shaft 35, to further promote reliability of the transmission 3.

Further, when the threaded portion 3501 on the end of the intermediate shaft 35 protruded from the first shaft hole 3111 is the external thread, the fastener 354 may be a nut, and the nut may be threaded onto the external thread, to realize fixing coupling of the fastener 354 with the end of the intermediate shaft 35; correspondingly, when the end of the intermediate shaft 35 protruded from the first shaft hole 3111 is hollow, and the threaded portion 3501 on the end of the intermediate shaft 35 protruded from the first shaft hole 3111 is configured to have an internal thread on an inner wall of the intermediate shaft 35, the fastener 354 may be a bolt, and the bolt extends into the inside of the intermediate shaft 35 and is threaded onto the internal thread on the inner wall of the intermediate shaft 35, to realize fixing coupling of the fastener 354 and the end of the intermediate shaft 35. This arrangement can, under the premise of ensuring tight and firm coupling of the fastener 354 and the end of the intermediate shaft 35, selectively set the type of the threaded portion 3501 and the fastener 354 fitted with the threaded portion 3501 according to structural requirements of the transmission 3, which not only facilitates production and manufacture, but also promote applicability of the intermediate shaft 35. The fastener 354 may be limited at an outer side of the first bearing 355, to ensure axial stability of the intermediate shaft 35.

As illustrated in FIGS. 3 and 4, the first sub-casing 311 defines a plurality of first shaft holes 3111, ends of the plurality of intermediate shafts 35 protrude from respective first shaft holes 3111, and the third sub-casing 313 covers the plurality of first shaft holes 3111. In at least one embodiment, first sub-casing 311 defines the plurality of first shaft holes 3111, and the plurality of intermediate shafts 35 are provided in one-to-one correspondence to the plurality of first shaft holes 3111. This arrangement can avoid failure of the transmission 3 due to mutual contact and mutual influence of the ends of the plurality of intermediate shafts 35 during normal rotation of the plurality of intermediate shafts 35, and can further promote stability and reliability of the intermediate shafts 35. Three intermediate shafts 35 may be provided. It could be understood that, a plurality of fasteners 354 may fasten respective intermediate shafts 35 at the same side, and then be sealed together with the third sub-casing 313, and this can make the structure of the transmission 3 simpler and assembly efficiency higher.

In some embodiments, the first sub-casing 311 defines a second shaft hole 3112, the fourth sub-casing 314 defines a third shaft hole 3141, and the second sub-casing 312 defines the first cavity 315. The power input shaft 32 passes through the first cavity 315 and two ends of the power input shaft 32 protrude from the second shaft hole 3112 and the third shaft hole 3141, respectively, and the third sub-casing 313 also covers the second shaft hole 3112.

As illustrated in FIG. 5, a first end of the power input shaft 32 passes through the first cavity 315 defined in the second sub-casing 312, and then protrudes from the third shaft hole 3141 of the fourth sub-casing 314 for power input coupling; a second end of the power input shaft 32 protrudes from the second shaft hole 3112 of the first sub-casing 311, and is covered by the third sub-casing 313. This arrangement can, under the premise of ensuring normal power input of the power input shaft 32, render the power input shaft 32 to be mounted and arranged in the transmission 3 more stably and firmly, to further promote structural reliability of the transmission 3.

In some embodiments, the second sub-casing 312 also defines the second cavity 316, the first intermediate shaft 351 and the third intermediate shaft 353 pass through the first cavity 315, and the second intermediate shaft 352 passes through the second cavity 316 to drivingly fitted with the second power output shaft 34.

In at least one embodiment, as illustrated in FIG. 4, the first intermediate shaft 351, the third intermediate shaft 353 and the power input shaft 32 together pass through the first cavity 315. Thus, the first intermediate shaft 351, the third intermediate shaft 353 and the power input shaft 32 can be ensured to protrude from the second sub-casing 312, the first intermediate shaft 351, the third intermediate shaft 353 and the power input shaft 32 can share the first cavity 315, and manufacturing process of the second sub-casing 312 can be simplified under the premise of no influence on normal operation of the first intermediate shaft 351, the third intermediate shaft 353, the second intermediate shaft 352 and the power input shaft 32. In addition, this can not only make internal structure of the transmission 3 more compact, but also reduce weight of the transmission 3.

In some embodiments, a side of the second sub-casing 312 towards the fourth sub-casing 314 defines a first accommodating space 5, a side of the fourth sub-casing 314 towards the second sub-casing 312 defines a second accommodating space 6, and the first accommodating space 5 and the second accommodating space 6 are arranged oppositely, to define an accommodating space for the second power output shaft 34. An end portion of the second power output shaft 34 protrudes from the accommodating space, and an angle between the second power output shaft 34 and the power input shaft 32 is 90 degrees.

In at least one embodiment, as illustrated in FIG. 5, an angle exists between an arrangement direction of the second power output shaft 34 and an arrangement direction of the power input shaft 32, the intermediate shaft 35 and the first power output shaft 33, the side of the second sub-casing 312 towards the fourth sub-casing 314 defines the first accommodating space 5, the side of the fourth sub-casing 314 towards the second sub-casing 312 defines the second accommodating space 6, the first accommodating space 5 and the second accommodating space 6 are arranged oppositely to define relatively sealed accommodating space, to correspond to the second power output shaft 34, and the second power output shaft 34 may be provided in it; furthermore, the end portion of the second power output shaft 34 protrudes from the accommodating space, this not only further promotes stability of mounting and arrangement of the second power output shaft 34, but also ensures relative independence of the second power output shaft 34.

Further, with reference to FIGS. 3 and 7, the angle between the second power output shaft 34 and the power input shaft 32 is 90 degrees, and the second power output shaft 34 arranged in this way can fully utilize space of the casing 31 in a direction perpendicular to the power input shaft 32. Thus, not only can space utilization be promoted, but also the structural layout of the transmission 3 can be more reasonable, to make structure of the transmission 3 more compact and further reduce volume of the transmission 3.

In some embodiments, the first accommodating space 5 internally defines at least two first arc-shaped grooves 51, the second accommodating space 6 internally defines at least two second arc-shaped grooves 61, and the at least two first arc-shaped grooves 51 and the at least two second arc-shaped grooves 61 are arranged oppositely respectively to define at least two circular mounting grooves. The second power output shaft 34 is fitted with at least two second bearings 43, and the at least two second bearings 43 are provided in the mounting grooves, respectively.

In at least one embodiment, as illustrated in FIG. 5, the at least two first arc-shaped grooves 51 and the at least two second arc-shaped grooves 61 are arranged oppositely to define the at least two circular mounting grooves, the second power output shaft 34 is provided in the mounting grooves, and the second power output shaft 34 is fitted with at least two second bearings 43. The second bearings 43 are located between the second power output shaft 34 and the mounting grooves, and the second bearings 43 can have a support effect on the second power output shaft 34, to reduce friction coefficient of the second power output shaft 34 during rotation. This arrangement can not only promote rotation efficiency of the second power output shaft 34 to reduce power loss due to a relatively large frictional force during rotation of the second power output shaft 34, but also reduce structural wear of the second power output shaft 34 and the first sub-casing 311 to prolong the service life of the second power output shaft 34. In addition, the second bearing 43 can also ensure rotary accuracy of the second power output shaft 34, to further promote reliability of the transmission 3.

In some embodiments, a bottom of the engine 1 defines an avoidance space 102 for avoiding the propeller shaft 10 coupled to the second power output shaft 34.

In at least one embodiment, as illustrated in FIG. 1, the avoidance space 102 of the bottom of the engine 1 can prevent the engine 1 from shielding the second power output shaft 34, and expose the second power output shaft 34, and coupling and arrangement of the propeller shaft 10 and the second power output shaft 34 can be convenient. This can not only facilitate mounting and arrangement of the propeller shaft 10 to ensure normal operation of the powertrain 100, but also can optimize structural design of the powertrain 100 without changing position of the engine 1.

In some embodiments, the engine 1 includes an oil sump 101, a middle of the oil sump 101 defines an oil storage portion 103 recessed downwards, and a side of the oil storage portion 103 towards the continuously variable transmission 2 is provided with the avoidance space 102.

Figure 2:
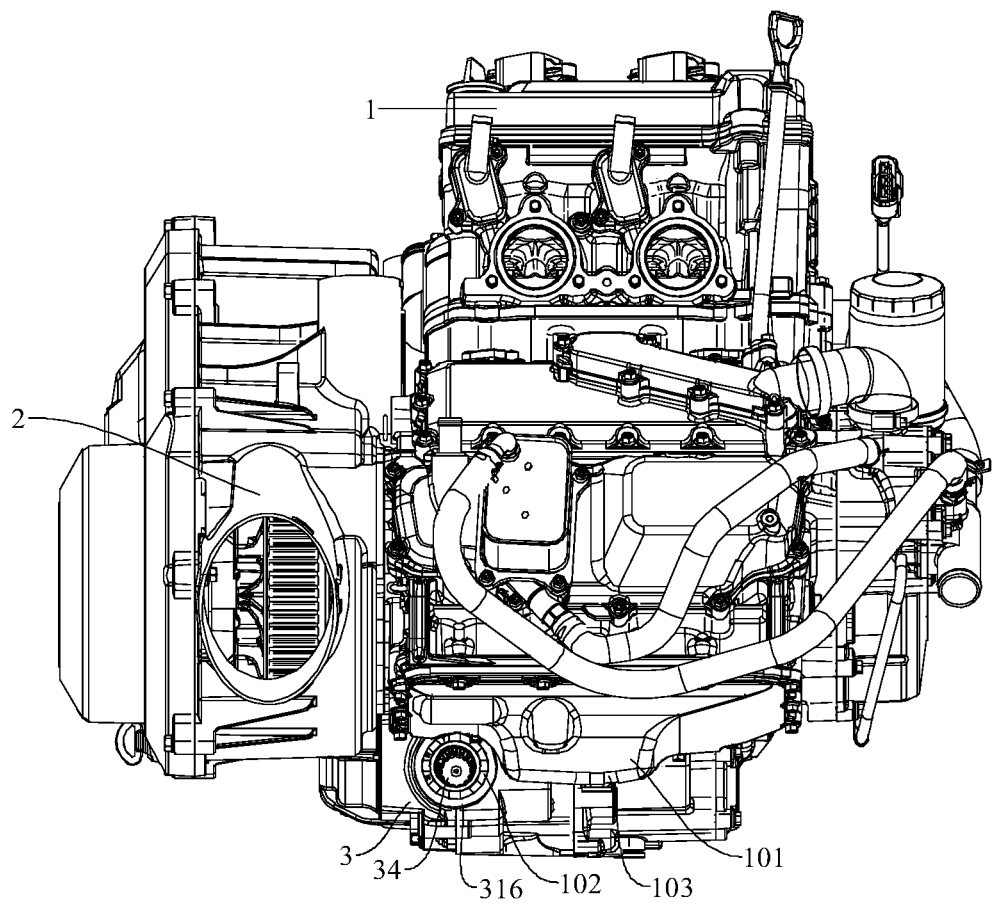
FIG. 2 is a schematic view of a powertrain according to an embodiment of the present disclosure from a second perspective.

In at least one embodiment, as illustrated in FIGS. 1 and 2, the oil sump 101 may stores lubrication oil, to maintain normal operation of the engine 1. The position of the oil sump 101 corresponds to a position of the second power output shaft 34, and in order to prevent the oil sump 101 from shielding the second power output shaft 34 and from hindering the mounting and arrangement of the second power output shaft 34 and the propeller shaft 10, the middle of the oil sump 101 is provided with the oil storage portion 103 recessed downwards, and the avoidance space 102 is provided in a side of the oil storage portion 103 towards the continuously variable transmission 2. Thus, arranged position of the oil sump 101 needs not to be changed, and under the premise of ensuring normal oil storage function of the oil storage portion 103, the oil sump 101 is prevented from affecting mounting and arrangement of the propeller shaft 10 and the second power output shaft 34 by ingeniously designing the shape of the oil sump 101. The ingenious design can not only ensure structural reliability of the powertrain 100, but also optimize the structural design of the powertrain 100.

In some embodiments, the transmission 3 is provided with a mounting platform, and the mounting platform is fixedly coupled to the engine 1 by the fastener 354.

In at least one embodiment, as illustrated in FIGS. 6 and 7, the casing 31 may be fixedly coupled to the engine 1 through the mounting platform 4, and the power input shaft 32 is coupled to the engine 1 in power input mode. The power input shaft 32 is rotatable under the drive of the engine 1, to ensure normal operation of the transmission 3. In addition, by providing the mounting platform, the transmission 3 can be produced and manufactured separately, and then wholly mounted onto the engine 1, to improve integrity of the transmission 3. The mounting platform may be mounted at an intake side or an exhaust side of the engine 1, correspondingly.

In at least one embodiment, as illustrated in FIGS. 6 to 8, a plurality of mounting platforms 4 are provided, and the plurality of mounting platforms 4 are spaced apart at a side of the casing 31, and the mounting platform 4 defines a mounting via hole 41 and/or a positioning pin hole 42. A plurality of mounting platforms 4 are provided, and the plurality of mounting platforms 4 can ensure degree of fixity of the side of the casing 31 with the engine 1; furthermore, the plurality of mounting platforms 4 are spaced apart at the side of the casing 31, and the side of the casing 31 can be fixed to the engine 1 more tightly, to avoid clearance between the side of the casing 31 and the engine 1.

In at least one embodiment, as illustrated in FIG. 6, four mounting platforms 4 are provided, and the four mounting platforms 4 are arranged in two rows and two columns. One of the two mounting platforms 4 in the same row is provided with the mounting via hole 41, and the other is provided with the mounting via hole 41 and the positioning pin hole 42; one of the two mounting platforms 4 in the same column is provided with the mounting via hole 41, and the other is provided with the mounting via hole 41 and the positioning pin hole 42.

Four mounting platforms 4 are provided, and the four mounting platforms 4 are arranged in two rows and two columns, to render the side of the casing 31 to be better fixedly coupled to the engine 1. Furthermore, one of the two mounting platforms 4 located in the same row is provided with the mounting via hole 41, and the other is provided with the mounting via hole 41 and the positioning pin hole 42; one of the two mounting platforms 4 in the same column is provided with the mounting via hole 41, and the other is provided with the mounting via hole 41 and the positioning pin hole 42; and the fastener 354 and a positioning pin can fix the mounting platform 4 onto the engine 1 through the mounting via hole 41 and the positioning pin hole 42, and this arrangement is more reasonable, to ensure balance of fixing between the side of the casing 31 and the engine 1.

In some embodiments, the engine 1 is internally provided with a crankshaft, a power output end of the crankshaft is coupled to a power input end of the continuously variable transmission 2, and a power output end of the continuously variable transmission 2 is coupled to the power input end of the transmission 3.

In at least one embodiment, as illustrated in FIG. 2, the engine 1, the continuously variable transmission 2 and the transmission 3 are coupled to one another, and collectively form a part of the powertrain 100, the engine 1 transmits power to the power input end of the continuously variable transmission 2 through the power output end of the crankshaft, and the continuously variable transmission 2 processes the power and then transmits the power to the power input end of the transmission 3 through the power output end, to power the transmission 3. Thus, power transmission in the powertrain 100 can be stable and continuous, to promote the reliability of the powertrain 100.

The all-terrain vehicle 1000 according to embodiments of the present disclosure includes two first half shafts 7, a propeller shaft 10 and a powertrain 100.

The powertrain 100 is a powertrain 100 according to any one of the above embodiments. A first end of the first power output shaft 33 is coupled to one of the first half shafts 7, a second first power output shaft 33 is coupled to the other of the first half shafts 7, and an end of the second power output shaft 34 is drivingly coupled to the propeller shaft 10.

In at least one embodiment, as illustrated in FIGS. 3, 6 and 7, the power input shaft 32 is drivingly coupled to the first power output shaft 33 and the second power output shaft 34. After the continuously variable transmission 2 transmits power to the power input shaft 32, the power input shaft 32 will transmit the power to the first power output shaft 33 and the second power output shaft 34 separately, the first end of the first power output shaft 33 is coupled to one of the first half shafts 7, the second end of the first power output shaft 33 is coupled to the other of the first half shafts 7, and the end of the second power output shaft 34 is drivingly coupled to the propeller shaft 10.

In the all-terrain vehicle 1000 according to embodiments of the present disclosure, at least one final drive 9 is omitted by replacing the final drive 9 with the transmission 3, the power can be directly output to the first half shafts 7 from the first power output shaft 33, and then to wheels coupled to the first half shafts 7. Thus, the transmission path can be effectively shortened, the transmission process can be simplified, the transmission stability can be improved, arrangement flexibility of the components of the all-terrain vehicle 1000 in a front-and-rear direction can be promoted, and mounting and arrangement difficulty can be reduced. In addition, the second power output shaft 34 can also output power to other half shafts through the propeller shaft 10, and four-wheel drive of the all-terrain vehicle 1000 can be realized, to promote power performance and driving stability of the all-terrain vehicle 1000.

In some embodiments, an end portion of the first half shaft 7 is provided with a first spline portion 71, an end portion of the first power output shaft 33 is provided with a second spline portion 332, and the first spline portion 71 is spline-fitted to the second spline portion 332.

In at least one embodiment, as illustrated in FIG. 3, the first power output shaft 33 and the first half shaft 7 can employ spline fit, the spline fit is simple and convenient, and the transmission is stable.

In some embodiments, the first spline portion 71 is an external spline, the second spline portion 332 is an internal spline, two ends of the first power output shaft 33 are located in the casing 31, and define the mounting grooves 331, and the inner peripheral wall of each mounting groove 331 forms the internal spline.

In at least one embodiment, as illustrated in FIG. 3, the end portion of the first half shaft 7 will extend into the mounting groove 331, and then the spline fit is achieved. Thus, the overall length of the transmission 3 and the two first half shafts 7 in the axial direction can be effectively shortened, to promote balance and stability of the all-terrain vehicle 1000.

In some embodiments, the first sub-casing 311 is provided with a first opening 3113 corresponding to an end portion of the first power output shaft 33, one of the first half shafts 7 is coupled to an end portion of the first power output shaft 33 through the first opening 3113. The second sub-casing 312 is provided with a second opening 3121 corresponding to the other end portion of the first power output shaft 33, and the other of the first half shafts 7 is coupled to the other end portion of the first power output shaft 33 through the second opening 3121. Thus, by providing the first opening 3113 and the second opening 3121, the end portion of the first half shaft 770 can conveniently extend into the casing 3120 for driving coupling, and this can reduce lateral width of the all-terrain vehicle 1000, and facilitate reasonable overall layout of the all-terrain vehicle 1000.

In some embodiments, the all-terrain vehicle 1000 also includes: a final drive 9 and two second half shafts 8. The final drive 9 is drivingly coupled to the propeller shaft 10, a first end of the final drive 9 is coupled to one of the second half shafts 8, and a second end of the final drive 9 is coupled to the other of the second half shafts 8.

It should be noted that, the engine 1, the continuously variable transmission 2 and the transmission 3 can transmit power to one another. The transmission 3 can also transmit power to the first half shaft 7 and the propeller shaft 10, the propeller shaft 10 can be coupled to the final drive 9, and the final drive 9 can also be coupled to the second half shafts 8. Since the final drive 9 is drivingly coupled to the propeller shaft 10, the first end of the final drive 9 is coupled to one of the second half shafts 8, and the second end of the final drive 9 is coupled to the other of the second half shafts 8. Thus, the power transmitted to the propeller shaft 10 can be transmitted to the wheels through the final drive 9 and the second half shafts 8. The first half shaft 7 may be a rear half shaft, and the second half shaft 8 may be a front half shaft.

In some embodiments, the all-terrain vehicle 1000 also includes front wheels 11 and rear wheels 12, the first power output shaft 33 is coupled to the rear wheels 12, and the second power output shaft 34 is coupled to the front wheels 11.

In at least one embodiment, the transmission 3 obtains power through the power input shaft 32, and the power will undergo variable speed process and then is output through the first power output end and the second power output end respectively. The first power output shaft 33 may be coupled to the rear wheels 12 and can transmit power to the rear wheels 12, and the second power output shaft 34 may be coupled to the front wheels 11 and can transmit power to the front wheels 11, to realize four-wheel drive of the all-terrain vehicle 1000 and promote performance of the all-terrain vehicle 1000.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout the present disclosure to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A powertrain, comprising:
   an engine;
   a continuously variable transmission drivingly coupled to the engine; and
   a transmission comprising a casing, a power input shaft, a first power output shaft and a second power output shaft, the power input shaft, the first power output shaft and the second power output shaft being provided in the casing, the power input shaft being drivingly coupled to the continuously variable transmission, the power input shaft being drivingly coupled to the first power output shaft and the second power output shaft separately in the casing, and an axis of the power input shaft being parallel to an axis of the first power output shaft and perpendicular to an axis of the second power output shaft,
   wherein the transmission further comprises a first intermediate shaft and a second intermediate shaft, the first intermediate shaft is drivingly coupled to the second intermediate shaft, the first intermediate shaft and the second intermediate shaft are provided in the casing; the first intermediate shaft is drivingly coupled to the power input shaft, the second intermediate shaft is drivingly coupled to both of the first power output shaft and the second power output shaft, and an axis of the second intermediate shaft is lower than the axis of the first power output shaft in a vertical direction, and
   the casing comprises a first sub-casing, a second sub-casing and a third sub-casing; the first sub-casing is arranged opposite the second sub-casing, the first sub-casing defines a first shaft hole, the third sub-casing is detachably coupled to a side of the first sub-casing away from the second sub-casing and covers the first shaft hole; and the intermediate shafts are provided on the first sub-casing and the second sub-casing and have an end protruded from the first shaft hole towards the third sub-casing.

2. The powertrain according to claim 1, wherein the continuously variable transmission is drivingly coupled to the engine, the second power output shaft has an output end protruded towards the engine, and in an axial direction of the power input shaft, the second power output shaft is located at a side of the casing closer to the continuously variable transmission than a side of the casing away from the continuously variable transmission.

3. The powertrain according to claim 1, wherein a plane perpendicular to an axis direction of the power input shaft is taken as a reference plane, and a projection of the continuously variable transmission on the reference plane and a projection of the second power output shaft on the reference plane at least partially overlap.

4. The powertrain according to claim 1, wherein when the powertrain is mounted on a vehicle, a gap exists between a projection of the continuously variable transmission on a horizontal plane and a projection of the second power output shaft on the horizontal plane.

5. The powertrain according to claim 1, wherein the axis of the first power output shaft is higher than the axis of the second power output shaft in the vertical direction.

6. The powertrain according to claim 1, wherein the axis of the first power output shaft is inclined relative to the axis of the second power output shaft.

7. The powertrain according to claim 1, wherein the axis of the second intermediate shaft is parallel to the axis of the first power output shaft and perpendicular to the axis of the second power output shaft.

8. The powertrain according to claim 7, wherein the second intermediate shaft and the first power output shaft are provided with a spur gear set or helical gear set therebetween, and the second intermediate shaft and the second power output shaft are provided with a bevel gear set therebetween.

9. The powertrain according to claim 1, wherein axes of the intermediate shafts are arranged in parallel with the axis of the power input shaft.

10. The powertrain according to claim 1, wherein the first power output shaft is located obliquely above the second intermediate shaft in the vertical direction.

11. The powertrain according to claim 10, wherein the transmission further comprise a third intermediate shaft drivingly coupled to the first intermediate shaft and the second intermediate shaft separately, the power input shaft is located obliquely above the first intermediate shaft in the vertical direction, the first intermediate shaft is located obliquely above the third intermediate shaft in the vertical direction, and the third intermediate shaft is located obliquely above the second intermediate shaft in the vertical direction.

12. The powertrain according to claim 11, wherein a plane where an axis of the first intermediate shaft and the axis of the second intermediate shaft lie is a first plane, the power input shaft and the third intermediate shaft are located at a same side of the first plane, and the power input shaft and the first power output shaft are located at two sides of the first plane, respectively.

13. The powertrain according to claim 11, wherein a plane where the axis of the second intermediate shaft and the axis of the second power output shaft lie is a second plane, and the power input shaft and the first power output shaft are located at a same side of the second plane.

14. An all-terrain vehicle, comprising:
two first half shafts;
a propeller shaft; and
a powertrain comprising:
an engine;
a continuously variable transmission drivingly coupled to the engine; and
a transmission comprising a casing, a power input shaft, a first power output shaft and a second power output shaft, the power input shaft, the first power output shaft and the second power output shaft being provided in the casing, the power input shaft being drivingly coupled to the continuously variable transmission, the power input shaft being drivingly coupled to the first power output shaft and the second power output shaft separately in the casing, and an axis of the power input shaft being parallel to an axis of the first power output shaft and perpendicular to an axis of the second power output shaft,
wherein the first power output shaft has a first end coupled to one of the first half shafts and a second end coupled to the other of the first half shafts, the second power output shaft has an end drivingly coupled to the propeller shaft,
wherein the transmission further comprises a first intermediate shaft and a second intermediate shaft, the first intermediate shaft is drivingly coupled to the second intermediate shaft, the first intermediate shaft and the second intermediate shaft are provided in the casing; the first intermediate shaft is drivingly coupled to the power input shaft, the second intermediate shaft is drivingly coupled to both of the first power output shaft and the second power output shaft, and an axis of the second intermediate shaft is lower than the axis of the first power output shaft in a vertical direction, and
the casing comprises a first sub-casing, a second sub-casing and a third sub-casing; the first sub-casing is arranged opposite the second sub-casing, the first sub-casing defines a first shaft hole, the third sub-casing is detachably coupled to a side of the first sub-casing away from the second sub-casing and covers the first shaft hole; and the intermediate shafts are provided on the first sub-casing and the second sub-casing and have an end protruded from the first shaft hole towards the third sub-casing.

15. The all-terrain vehicle according to claim 14, wherein an end portion of the first half shaft is provided with a first spline portion, an end portion of the first power output shaft is provided with a second spline portion, and the first spline portion is spline-fitted to the second spline portion.

16. The all-terrain vehicle according to claim 15, wherein the first spline portion is an external spine, the second spline portion is an internal spline, two ends of the first power output shaft are located in the casing and define mounting grooves, and the internal spline is formed on an inner peripheral wall of each mounting groove.

17. The all-terrain vehicle according to claim 14, further comprising a final drive and two second half shafts, the final drive being drivingly coupled to the propeller shaft, the final drive having a first end coupled to one of the second half shafts, and a second end coupled to the other of the second half shafts.

18. The powertrain according to claim 14, further comprising a front wheel and a rear wheel, the first power output shaft being coupled to the rear wheel, and the second power output shaft being coupled to the front wheel.

* * * * *